(12) United States Patent
Kawabata

(10) Patent No.: US 6,771,360 B2
(45) Date of Patent: Aug. 3, 2004

(54) METHOD AND APPARATUS FOR MEASURING WAVELENGTH DISPERSION VALUE AND/OR NONLINEAR COEFFICIENT OF OPTICAL FIBERS

(75) Inventor: Keisuke Kawabata, Tokyo (JP)

(73) Assignee: Hitachi Cable, Ltd. (JP)

( * ) Notice: Subject to any disclaimer, the term of this patent is extended or adjusted under 35 U.S.C. 154(b) by 0 days.

(21) Appl. No.: 10/304,908

(22) Filed: Nov. 26, 2002

(65) Prior Publication Data
US 2003/0137653 A1 Jul. 24, 2003

(30) Foreign Application Priority Data
Nov. 30, 2001 (JP) ........................................ 2001-367225

(51) Int. Cl.⁷ ............................................. G01N 21/00
(52) U.S. Cl. .................................................... 356/73.1
(58) Field of Search ..................... 356/73.1; 385/24–27, 385/39–46, 122–123, 147; 250/551, 227.18, 227.23; 398/55–87

(56) References Cited

U.S. PATENT DOCUMENTS 5,724,126 A * 3/1998 Nishi et al. ................. 356/73.1
6,366,376 B1 * 4/2002 Miyata et al. ................. 398/79

OTHER PUBLICATIONS

Optics Letters/vol. 21, No. 24/Dec. 15, 1996, pp. 1966–1968 "Direct continuous–wave measurement of n2 in various types of telecommunication fiber at 1.55 μm" A. Boskovic, S. V. Chernikov, and J. R. Taylor.

Article entitled Self–phase–modulation in silica optical fibers, by R. H. Stolen and Chinlon Lin, published in the Physical Review A, General Physics, vol. 17, Third Series, No. 4, dated Apr. 1978, published by the American Physical Society by the American Institute of Physics.

Article entitled Direct continuous–wave measurement of n in various types of telecommunication fiber at 1.55 m, by A. Boskovic, S.V. Chernikov and J.R. Raylor, published in Optics Letters/vol. 21, No. 24/Dec. 15, 1996.

* cited by examiner

Primary Examiner—Tu T. Nguyen
(74) Attorney, Agent, or Firm—James B. Conte; Barnes & Thornburg

(57) ABSTRACT

A method and an apparatus for measuring wavelength dispersion value and/or nonlinear coefficient of optical fibers which realize high accurate nonlinear coefficient and wavelength dispersion value without influence of emitting power at measurement, length of test optical fiber, wavelength spacing of light source, and varying wavelength dispersion value of light source are provided. An apparatus is comprising a spectrum analyzer for measuring four wave mixing optical intensity generated in test optical fiber by emitting pump light and signal light to test optical fiber for each peak wavelength spacing, and for measuring optical intensity of a plurality of line spectrum constituting pump light and a plurality of line spectrum constituting signal light respectively, and an operating circuit for obtaining nonlinear coefficient and/or wavelength dispersion value by calculating so that maximum value of four wave mixing optical intensity in each spectrum wavelength spacing calculated from optical strength of line spectrum of pump light and signal light measured by spectrum analyzer coincides with measured value of four wave mixing optical intensity in each spectrum wavelength spacing measured by spectrum analyzer.

4 Claims, 6 Drawing Sheets

METHOD AND APPARATUS FOR MEASURING WAVELENGTH DISPERSION VALUE AND/OR NONLINEAR COEFFICIENT OF OPTICAL FIBERS

BACKGROUND OF THE INVENTION

1. Field of the Invention

The present invention relates to a method and an apparatus for measuring wavelength dispersion value and/or nonlinear coefficient of optical fibers.

2. Prior Art

Recently, accompanied with explosive increase in data communication such as internet, rapid increase of data transmission capacity has been required. At present, wavelength division multiplexing (WDM) transmission system which transmits simultaneously a plurality of signal lights differed slightly in wavelength through an optical fiber has been used practically, and applied to a trunk transmission line and an undersea optical cable. According to this, enlargement of transmission capacity has been progressed rapidly, however, increase of wave number and increase of bit rate of signal light have been caused various problems. For example, different dispersion is occurred at both ends of using wavelength band width by inherent wavelength dispersion value of an optical fiber, therefore, problems of wave form deterioration after transmission and of nonlinear phenomenon are caused. The nonlinear phenomenon is caused by change of reflective index of an optical fiber constituting a transmission line, and four wave mixing (FWM) corresponds to this phenomenon. Especially, the problem is serious in case of a plurality of different wavelength signal lights are transmitted at long distance such as WDM transmission. These dispersion and nonlinear phenomenon may become main factor which deteriorates transmission quality. In order to solve these problems, development of an optical fiber suppressing nonlinear phenomenon is required, and accompanied with this, establishing a method for measuring nonlinear refractive index or nonlinear coefficient is required. Nonlinear refractive index $n_2$ is a characteristic of an optical fiber constituting material, and nonlinear coefficient $N_2$ is a characteristic of an optical fiber, by defining an effective core area of an optical fiber is $A_{eff}$, relation between $n_2$ and $N_2$ is expressed as equation (1).

$$N_2=(n_2/A_{eff}) \quad (1)$$

According to equation (1), if effective core area $A_{eff}$ is known, nonlinear refractive index $n_2$ is calculated from nonlinear coefficient $N_2$, therefore, method for measuring nonlinear refractive index $n_2$ and method for measuring nonlinear coefficient $N_2$ are substantially the same.

As a method for measuring nonlinear coefficient of an optical fiber, a method of emitting a pulse light to an optical fiber from a pulse light sauce, measuring phase shift from change of power spectrum wave form caused to signal light by self phase modulation, and obtaining nonlinear refractive index has been reported (R. H. Stolen and Chinlon Lin, Physical Review A, vol. 17, no. 4, p. 1448–1453 (1978)). This method is generally called self phase modulation (SPM) method.

Further, a method of emitting probe light and pump light modulated sinusoidally at predetermined frequency to an optical fiber, detecting probe light by delayed self heterodyne detecting, measuring phase shift of probe light caused by pump light, and obtaining nonlinear refractive index has also been reported (A. Wada et al, ECOC 92, p. 45 (1942)). This method is generally called mutual phase modulation (XPM) method.

Further more, a method of emitting two continuous wave (CW) light to an optical fiber, measuring optical intensity ratio between first siderove wave generated by SPM effect and measuring light, and obtaining nonlinear coefficient from relation between average input strength and optical intensity ratio has been reported (Boskovic et al, Optics Letters, Vol. 21, no. 24, p. (1996)). This method is called CW-SPM method, it became to be used mainly at present.

FIG. 1 is a block diagram showing measuring apparatus using CW-SPM method.

Signal lights from CW light source 1, 2 are arranged polarization state by polarization controller 3, 4, and coupled by optical fiber coupler 5. The coupled signal light is amplified by an optical amplifier 6 such as, for example, erbium (Er) added optical fiber amplifier. At this tome, since noise level is also amplified, noise level is lowed by band-pass filter 7. The signal light is amplified again by an amplifier 8, and emitted to a test optical fiber 10 through an optical fiber coupler 9. Wave form spectrum emitted from a test optical fiber 10 is measured by optical spectrum analyzer 13.

The optical fiber coupler 9 is to distribute emitted light, a power meter 12 is to measure emitted power, and a power meter 11 is to consider attenuation of emitting power by measuring rear Brillouin scattering.

FIG. 2 shows observed wave form measured by apparatus shown in FIG. 1, the horizontal axis showing wavelength and the vertical axis showing light intensity.

Measuring optical power intensity $I_0$, $I_1$ as shown in FIG. 8, and substituting obtained data for equation (2) and equation (3) with input power P measured by the power meter 12, $n_2/A_{eff}$ is obtained.

$$(I_0/I_1)=\{J_0^2(\phi_{SPM}/2)+J_1^2(\phi_{SPM}/2)\}/\{J_1^2(\phi_{SPM}/2)+J_2^2(\phi_{SPM}/2)\} \quad (2)$$

$$\phi_{SPM}=(4\pi n_2/\lambda A_{eff})L_{eff}P \quad (3)$$

Where $J_n$ is the first kind Bessel function, $\phi_{SPM}$ is the maximum phase shift and $L_{eff}$ is effective length of the test optical fiber 10.

In a conventional method for measuring nonlinear coefficient of optical fibers, there is a problem that high accuracy measurement is difficult.

In SPM method, nonlinear coefficient is determined by relation between maximum phase shift $\phi_{SPM}$ obtained by comparing output power spectrum wave form with theoretical wave form and optical power.

However, theoretical spectrum wave form shows time wave form of emitting light pulse being Gaussian as well as wave form having phase shift $\phi_{SPM}=0$ to pulse peak, it is obtained by assuming condition that frequency chirp is not exist and can ignore effect of group velocity distribution of optical fiber. Therefore, in order to generate pulse light closing to an ideal, complicated adjustment work is needed.

Since, frequency chirp is included in actually generated optical pulse, generating complete ideal wave form being impossible, and difference from theoretical spectrum wave form being arisen, therefore, it is difficult to raise measurement accuracy.

XPM method is an indirect method for improving problem that SPM method is difficult to generate ideal pulse light. However, in XPM method, phase shift depends on relative polarization state of pump light and probe light, in a measurement of usual optical fiber which does not maintain polarization state, operation to take average of many polarization state is necessary to raise measurement accuracy. Further, because of indirect measuring method using two wavelength signal lights, measuring apparatus and analysis of measured data are complicated. Further more, since effect of group velocity distribution of optical fiber is ignored as well as SPM method, group velocity distribution of optical fiber may actually influence to measuring result.

Also in CW-SPM method used mostly at present, since effect of group velocity distribution of optical fiber is ignored, obtained nonlinear coefficient is differed greatly by emitting power at measurement, length of a test optical fiber, wavelength interval of two CW light sources, and wavelength dispersion value of light source wavelength.

It is pointed out that these three methods do not give coincident measurement results to the same optical fiber.

SUMMARY OF THE INVENTION

An object of the present invention is to provide a method and an apparatus for measuring wavelength dispersion value and/or nonlinear coefficient of optical fibers which realize high accurate nonlinear coefficient and wavelength dispersion value without influence of emitting power at measurement, length of test optical fiber, wavelength spacing of light source, and varying wavelength dispersion value of light source.

In accordance with the present invention, there is provided a method for measuring wavelength dispersion value and/or nonlinear coefficient of optical fibers comprising, a process for emitting a pump light emitted from a first continuous wave light source and a signal light emitted from a second continuous wave light source to a test optical fiber by varying peak wavelength spacing between said pump light and said signal light, and measuring four wave mixing optical intensity generated in said test optical fiber at every peak wavelength spacing, a process for measuring optical intensity of a plurality of line spectrum constituting said pump light and a plurality of line spectrum constituting said signal light respectively, and a process for calculating so that maximum value of four wave mixing optical intensity in each line spectrum wavelength spacing calculated from said measured optical intensity of line spectrum of said pump light and said signal light coincides with measured value of optical intensity of four wave mixing in each peak wavelength spacing, and obtaining nonlinear coefficient and/or wavelength dispersion value.

Further, there is provided a method for measuring wavelength dispersion value and/or nonlinear coefficient of optical fibers comprising, a process for emitting a pump light emitted from a first continuous wave light source and a signal light emitted from a second continuous wave light source to a test optical fiber by varying peak wavelength spacing between said pump light and said signal light, and measuring four wave mixing optical intensity generated in said test optical fiber at every peak wavelength spacing, a process for measuring optical intensity of a plurality of line spectrum constituting said pump light and a plurality of line spectrum constituting said signal light respectively, and a process for calculating so that maximum value of four wave mixing optical intensity $P_1(L)$ in each line spectrum wavelength spacing calculated from substituting measured optical intensity of line spectrum of said pump light and said signal light, and nonlinear coefficient $N_2$ and wavelength dispersion value $D(f_k)$ as variable numbers for the equation $$P_1(L)=\eta'(2\pi N_2/\lambda_p)^2 P_p^2 P_s \exp(-\alpha L)[\{1-\exp(-\alpha L)\}/\alpha]$$

(where, $\lambda_p$ is wavelength of pump light, Pp is optical intensity of line spectrum of pump light, Ps is optical intensity of line spectrum of signal light, α is transmission loss of optical fiber, and L is length of test optical fiber) coincides with measured value of optical intensity of four wave mixing in each peak wavelength spacing, and obtaining nonlinear coefficient and/or wavelength dispersion value from the value of said substituted nonlinear coefficient $N_2$ and wavelength dispersion value $D(f_k)$ as variable numbers.

Where, η' is four wave mixing (FWM) efficiency expressed by equation, $$\eta' = \{P_1(L, \Delta k')P_1(L, \Delta k = 0)\}$$
$$= [\alpha^2/\{\alpha^2 + (\Delta k')^2\}][1 + \{4\exp(-\alpha L)\sin^2(\Delta k' L/2)\}/\{\exp(-\alpha L)-1\}^2]$$

where, Δk' is phase adjustment factor expressed by equation, $$\Delta k'=\Delta k-(2\pi N_2/\lambda_p)(2P_p-P_s)[\{1-\exp(-\alpha L_{e\!f\!f})\}/\alpha L_{e\!f\!f}]$$

where, Δk is expressed by equation, $$\Delta k=2|f_p-f_s|^2 2\pi\lambda_s^2 D(f_k)/c$$

(where, $f_p$ is frequency of line spectrum of pump light, $f_s$ is frequency of line spectrum of signal light, and $\lambda_s$ is wavelength of line spectrum of signal light) and $L_{e\!f\!f}$ is effective length of test optical fiber expressed by equation.

$$L_{e\!f\!f}=\{1-\exp(-\alpha L)\}/\alpha$$

Further more, there is provided an apparatus for measuring wavelength dispersion value and/or nonlinear coefficient of optical fibers comprising, a first continuous wave light source for emitting a pump light, a second continuous wave light source for emitting signal light with different peak wavelength from said pump light and varying peak wavelength, a spectrum analyzer for measuring four wave mixing optical intensity generated in test optical fiber by emitting said pump light and said signal light to test optical fiber for each peak wavelength spacing, and for measuring optical intensity of a plurality of line spectrum constituting said pump light and a plurality of line spectrum constituting said signal light respectively, and an operating circuit for obtaining nonlinear coefficient and/or wavelength dispersion value by calculating so that maximum value of four wave mixing optical intensity in each spectrum wavelength spacing calculated from optical strength of line spectrum of said pump light and said signal light measured by said spectrum analyzer coincides with measured value of four wave mixing optical intensity in each spectrum wavelength spacing measured by said spectrum analyzer.

In the present invention, it is preferable that operating circuit is mounted in spectrum analyzer.

DESCRIPTION OF THE PREFERRED EMBODIMENTS

Preferred embodiments of the present invention will be explained in conjunction with accompanying drawings.

Figure 1:
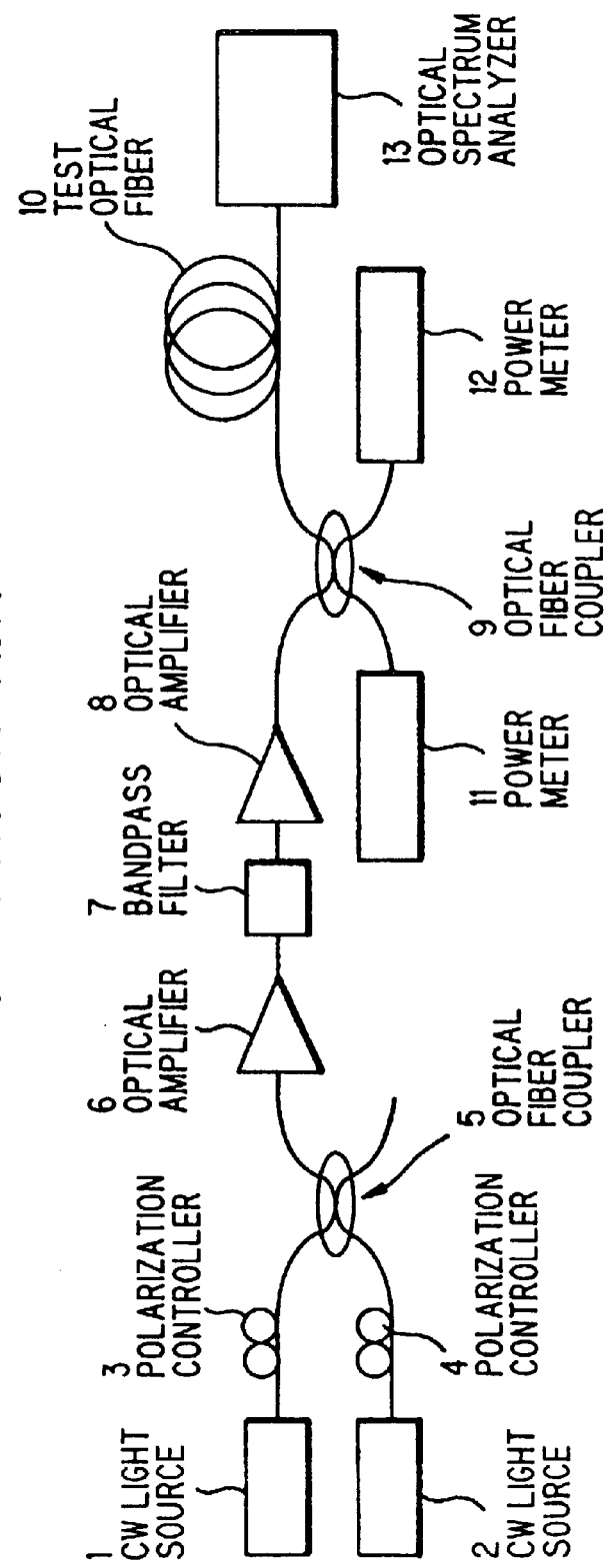
FIG. 1 is a block diagram showing conventional measuring apparatus using CW-SPM method.
Figure 2:
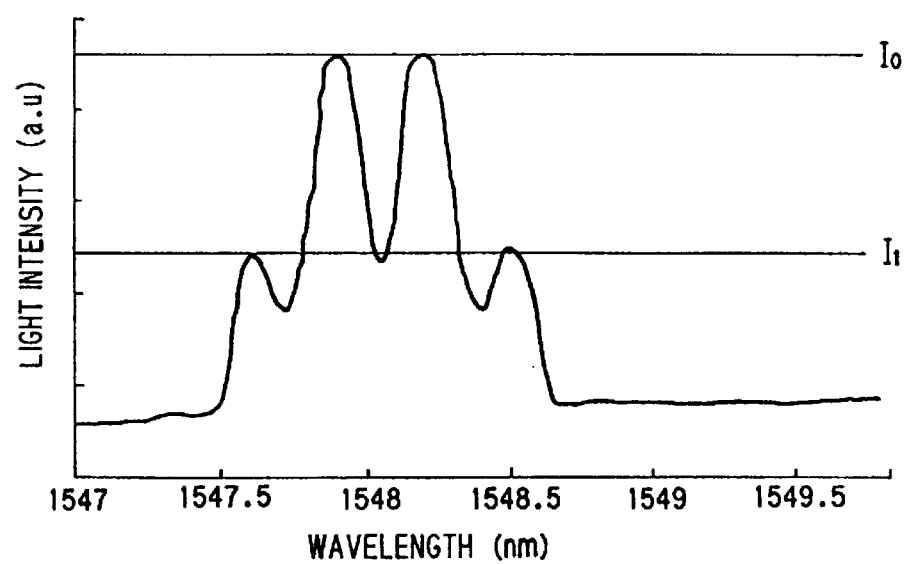
FIG. 2 is a graph showing observed wave form measured by apparatus shown in FIG. 1.
Figure 3:
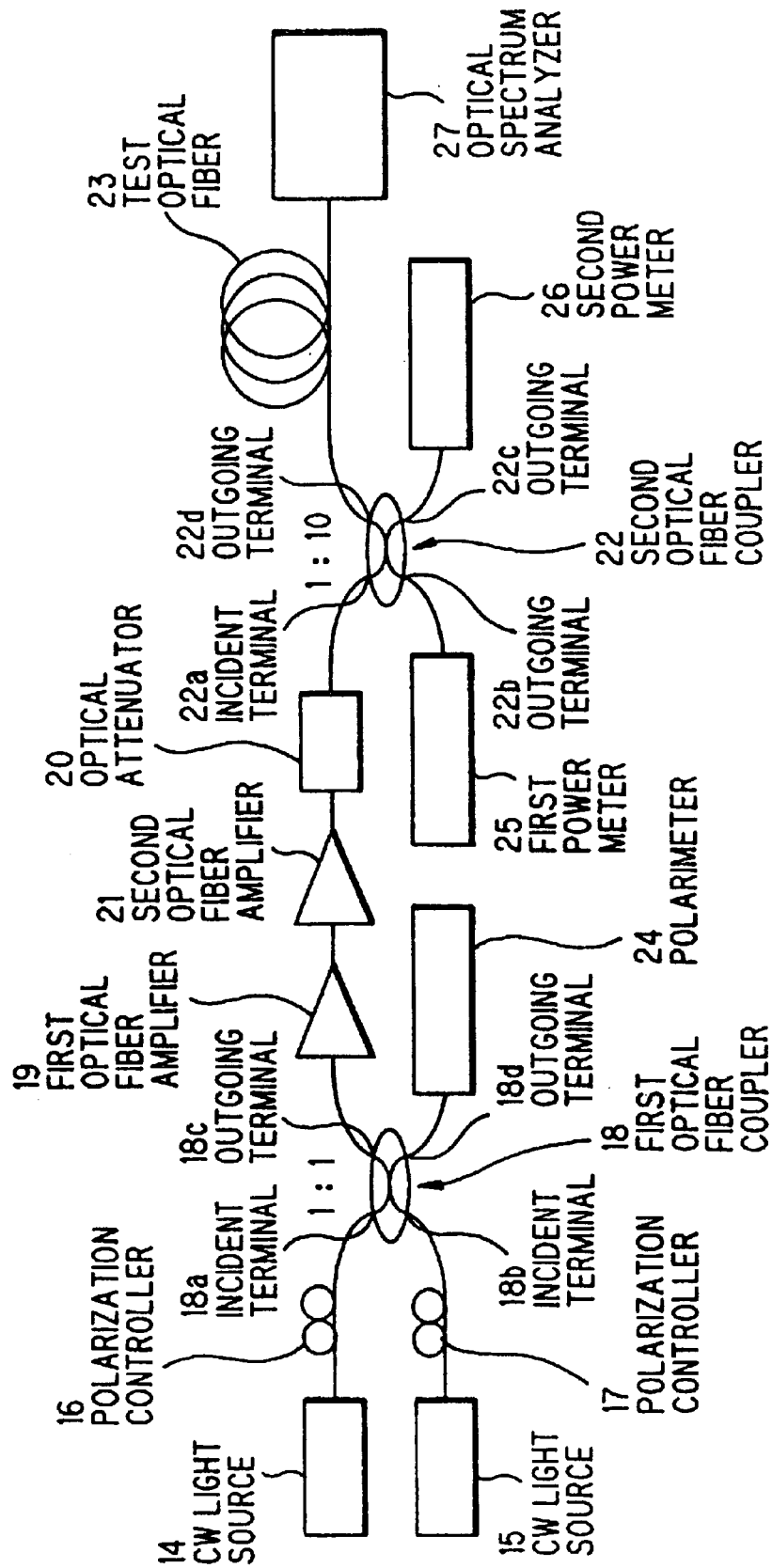
FIG. 3 is a block diagram showing measuring apparatus of one embodiment of the present invention.

FIG. 3 is a block diagram showing one embodiment of measuring apparatus applicable to measuring wavelength dispersion value and/or nonlinear coefficient of optical fibers of the present invention.

The measuring apparatus is to measure four wave mixing generated power by transmitting light from two light sources to test optical fiber, obtaining nonlinear coefficient by substituting the measured value for equation (8), measure spectrum data of light sources by spectrum analyzer, and obtain wavelength distribution value by substituting the measured value for equation (8). Therefore, the measuring apparatus comprising mainly CW light emitting means, an emitting light wave form adjustment portion, and a characteristic measuring portion which measures test optical fiber characteristic.

The CW light emitting means comprising two CW light sources (for example double hetero junction laser diode) 14, 15. With respect to the either CW light source 14, oscillating wavelength is fixed (for example 1550.00 nm), and with respect to the other CW light source 15, oscillating wavelength is variable (for example from 1550.291 nm to 1551.310 nm).

The emitting light wave form adjustment portion comprising the polarization controller 16, 17 of which each incidental terminal is respectively connected to outgoing terminal of CW light source 14, 15, the first optical fiber coupler (for example, branching ratio 1:1) 18 of which two incidental terminals 18a, 18b are respectively connected to each outgoing terminal of polarization controller 16, 17, the first optical amplifier (for example, erbium added optical fiber amplifier) 19 of which incidental terminal is connected to one outgoing terminal 18c of the first optical fiber coupler 18, the second optical amplifier 21 of which incidental terminal is connected to outgoing terminal of the first optical amplifier 19, the variable optical attenuator 20 of which incidental terminal is connected to the outgoing terminal of the second optical amplifier 21, polarimeter 24 of which incidental terminal is connected to the other outgoing terminal 18d of the optical fiber coupler 18, and the second optical fiber coupler (for example, branching ratio 1:10) 22 of which incidental terminal 22a is connected to the outgoing terminal of the optical attenuator 20.

The polarization controller 16, 17 is to maintain polarization state of signal lights from the CW light source 14, 15 as linear polarization.

The characteristic measuring portion comprising the first power meter 25 of which incidental terminal is connected to the first outgoing terminal 22b of the second optical fiber coupler 22, the second power meter 26 of which incidental terminal is connected to the second outgoing terminal 22c of the second optical fiber coupler 22, and the optical spectrum analyzer 27 of which incidental terminal is connected to the other terminal of the test optical fiber 23 of which one terminal is connected to the third outgoing terminal 22d of the second optical coupler 22.

With respect to amplification of light, two sets of the first and second optical amplifiers 19, 21 are used in the present embodiment, one set of high gain optical amplifier may be used in the present invention. Further, if oscillation is not occurred by positive feedback, multi stage amplification by more than three sets of amplifiers may be applicable, furthermore, to improve SN ratio combination of multi stage amplification and negative feedback may be applicable in the present invention.

Next, operation of measuring apparatus shown in FIG. 3 will be explained.

The light from the either CW light source 14 is linearly polarized by the polarization controller 16, and the light from the other CW light source 15 is linearly polarized by the polarization controller 17 and coincides with polarization direction of the light from the either CW light source 14. The both lights are coupled by the first optical fiber coupler 18, thereafter the coupled light is distributed equally, the coupled light from the either outgoing terminal 18d is emitted to the polarimeter 24. The polarimeter 24 is usually surveying polarization state of the light from the polarization controller 16, 17.

The coupled light from the other outgoing terminal 18c of the first optical coupler 18 is amplified by the first and second optical amplifiers 19, 21, thereafter, the emitted power is attenuated to a predetermined value by valuable attenuator 20.

The coupled light passed through the valuable attenuator 20 is emitted to the second optical fiber coupler 22, and distributed at the ratio of 1:10, thereafter, emitted to the test optical fiber 23 and the first and second power meters 25, 26. Namely, the light having optical intensity of ten times of the first power meter 25 is emitted to the test optical fiber 23.

If strong light is emitted to the test optical fiber 23, the influence of rear Brillouin scattering increases, the intensity of the emitted light to the test optical fiber 23 does not actually reach 10 times of the emitted light to the second power meter 26. Therefore, in order to estimate emitting light power by considering rear Brillouin scattering, the first power meter 25 is provided.

In the outgoing coupled light from the test optical fiber 23, new spectrum power generated in the process of four light wave mixing is observed by the optical spectrum analyzer 27.

Next, in order to obtain an approximate solution expressing power of four light wave mixing (FWM), nonlinear Schrödinger's equation is used as follows. Assuming that new weak wave of angular frequency $\omega_1$ is generated by mixing three pump wave of angular frequency $\omega_2$, $\omega_3$, $\omega_4$ through FWM process. Including loss of self phase modulation (SPM) and/or mutual phase modulation (XPM) of pump wave, Schrödinger's equation combined all four light waves is expressed by equations (4)–(7) (Shuxian Song, et al, Journal of Lightwave Technology, vol. 17, no. 1999). Where, $A_n$ (n=1–4) shows electric field distribution at $\omega_n$.

$$(d/dz)A_1 = -(1/2)\alpha A_1 + 2i\gamma(|A_2|^2+|A_3|^2+|A_4|^2)A_1 + (1/3)D_0 i\gamma A_2 A_3 A_4^* \exp(i\Delta kz) \quad (4)$$

$$(d/dz)A_2 = -(1/2)\alpha A_2 + i\gamma(|A_2|^2+2|A_3|^2+2|A_4|^2)A_2 \quad (5)$$

$$(d/dz)A_3 = -(1/2)\alpha A_3 + i\gamma(2|A_2|^2+|A_3|^2+2|A_4|^2)A_3 \quad (6)$$

$$(d/dz)A_4 = -(1/2)\alpha A_4 + i\gamma(2|A_2|^2+2|A_3|^2+|A_4|^2)A_4 \quad (7)$$

Where, $D_0$ is degeneration factor, when degenerating is occurred the factor $D_0$ is 3, and when degenerating is not occurred the factor $D_0$ is 6. Further, i is imaginary number, z is distance, α is loss, γ is nonlinear coefficient ($\gamma=(2\pi n_2/\lambda A_{\text{eff}})=(2\pi N_2/\lambda)$). Δk is called as linear phase-matching factor, and expressed as equation (11).

As written in the above Shuxian Song et al reference, obtain analysis solution from equations (4)–(7) by considering attenuation of pump light, further adding FWM efficiency η' to equations (4)–(7), FWM power $P_1(L)$ is expressed as equation (8). Where, $P_2$–$P_4$ is incidental power at $\omega_2$–$\omega_4$, and L is optical fiber length.

$$P_1(L)=(\eta'/9)D_0\gamma^2 P_2 P_3 P_4 \exp(-\alpha L) \times [\{1-\exp(-\alpha L)\}/\alpha]^2 \quad (8)$$

Where, FWM efficiency η' is given by equation (9).

$$\eta' = \{P_1(L, \Delta k')P_1(L, \Delta k = 0)\} \quad (9)$$
$$= [\alpha^2/\{\alpha^2 + (\Delta k')^2\}][1 + \{4\exp(-\alpha L)\sin^2(\Delta k' L/2)\}/\{\exp(-\alpha L)-1\}^2]$$

Where, phase-matching factor Δk' is expressed by equation (10).

$$\Delta k'=\Delta k-\gamma(P_2+P_3-P_4)\times[\{1-\exp(-\alpha L_{\text{eff}})\}/\alpha L_{\text{eff}}] \quad (10)$$

Accordingly, linear phase adjustment factor Δk is expressed as equation (11).

$$\Delta k=\Delta f_{ik}\Delta f_{jk}(\Delta f_{ik}+\Delta f_{jk})(2\pi\lambda_k^2/c)\{D(f_k)+(\lambda_k^2/2c)(dD/d\lambda)(f_k)\} \quad (11)$$

Where, c is light velocity, $D(f_k)$ is wavelength dispersion value, $(dD/d\lambda)$ $(f_k)$ is wavelength dispersion slope. Further, $\lambda_k$ is wavelength at $\omega_4$, satisfying equations (12) and (13).

$$\Delta f_{ik}=|f_i-f_k|=|f_2-f_4| \quad (12)$$

$$\Delta f_{jk}=|f_j-f_k|=|f_3-f_4| \quad (13)$$

Accordingly, by measuring four wave mixed generating power $P_1(L)$ using apparatus shown in FIG. 3, unknown value in equations (8)–(11) are nonlinear coefficient γ, wavelength dispersion value $D(f_k)$, and wavelength dispersion slope $(dD/d\lambda)$ $(f_k)$.

When an optical fiber which wavelength dispersion value $D(f_k)$ and wavelength dispersion slope $(dD/d\lambda)$ $(f_k)$ are known is used as the test optical fiber 23, it is possible to obtain in high accuracy nonlinear coefficient γ without other requirement by substituting four wave mixing generated power $P_1(L)$ for equation (8).

However, when an optical fiber which nonlinear coefficient γ, wavelength dispersion value $D(f_k)$, and wavelength dispersion slope $(dD/d\lambda)$ $(f_k)$ are unknown is used as the test optical fiber 23, some condition become necessary.

In equation (11), referring to inside of a parenthesis of right-hand side, except for wavelength dispersion value $D(f_k)$ is near zero, relation of equation (14) is established. Therefore, equation (15) is established, and by considering equations (12), (13), equation (16) is obtained as approximate equation of equation (11).

$$D(f_k) \geq (\lambda_k^2/2c)(dD/d\lambda)(f_k) \quad (14)$$

$$(\lambda_k^2/2c)(dD/d\lambda)(f_k)=0 \quad (15)$$

$$\Delta k=|f_2-f_4||f_3-f_4|(|f_2-f_4|+|f_3-f_4|)(2\pi\lambda_k^2/c)D(f_k) \quad (16)$$

In the present invention, since optical intensity of degenerating four wave mixing is measured, degeneration factor $D_0$ in equation (8) is 3. Further, establishing that CW light emitted from CW light source 14 is pump light, CW light emitted from CW light source 15 is signal light, optical intensity thereof are $P_p$, $P_s$, and frequency thereof are $f_p$, $f_s$ respectively, $P_2$, $P_3$, $P_4$ in equations (8) and (10) are replaced with $P_2=P_3=P_p$, $P_4=P_s$, and $f_2$, $f_3$, $f_4$ in equation (16) are replaced with $f_2=f_3=f_p$, $f_4=f_s$. Therefore, equations (17)–(19) are obtained by modifying equations (8), (10) and (16). In addition, equation (9) relating to η' remains as it is.

$$P_1(L)=\eta'(2\pi N_2/\lambda_p)^2 P_p^2 P_s \exp(-\alpha L)[\{1-\exp(-\alpha L)\}/\alpha] \quad (17)$$

$$\Delta k'=\Delta k-(2\pi N_2/\lambda_p)(2P_p-P_s)[\{1-\exp(-\alpha L_{\text{eff}})\}/\alpha L_{\text{eff}}] \quad (18)$$

$$\Delta k=2|f_p-f_s|^3 2\pi\lambda_s^2 D(f_k)/c \quad (19)$$

As explained above, in theoretical approximation formula, only nonlinear coefficient $N_2$ and wavelength dispersion value $D(f_k)$ are unknown.

Next, what kind of influence is brought about to FWM generated power $P_1(L)$ by these two parameters $N_2$ and $D(f_k)$ is explained as follows.

Figure 4:
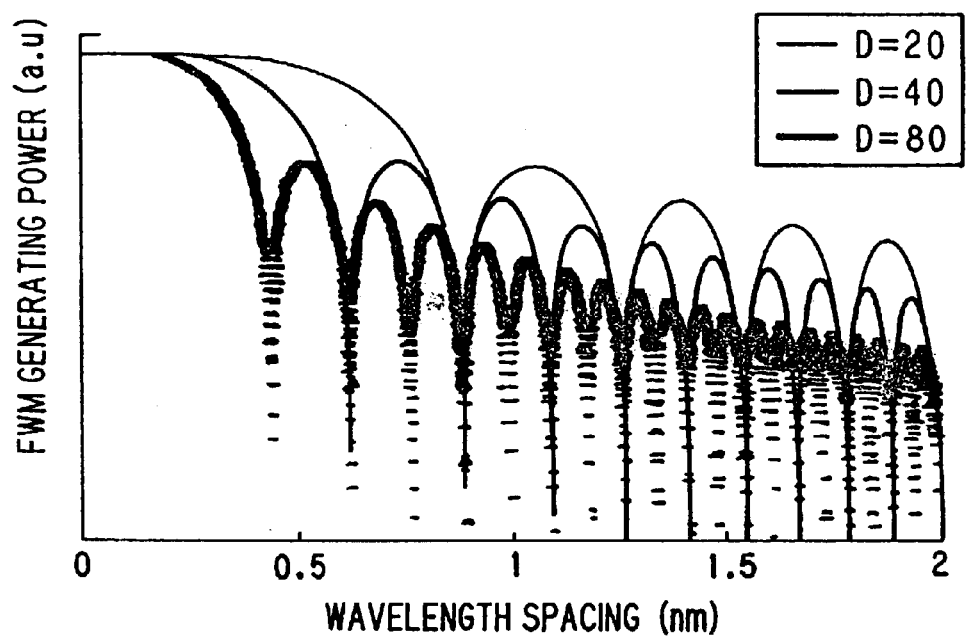
FIG. 4 is a graph showing relation between wavelength spacing and FWM generating power, when nonlinear coefficient $N_2$ is set constant and wavelength dispersion value $D(f_k)$ is varied.

FIG. 4 shows relation between wavelength spacing and FWM generated power, when nonlinear coefficient $N_2$ is fixed and wavelength dispersion value $D(f_k)$ is varied as 20, 40, 80 (ps/nm/km). Horizontal axis shows wavelength spacing and vertical axis shows FWM generated power.

From FIG. 4, it is confirmed that FWM generated power level is not varied and peak value of FWM generated power is varied.

Figure 5:
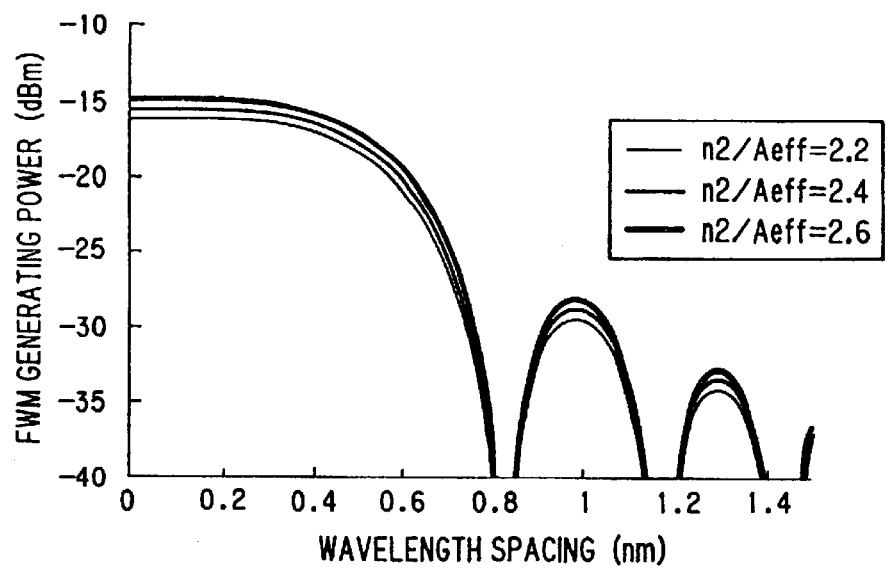
FIG. 5 is a graph showing relation between wavelength spacing and FWM generating power, when wavelength dispersion value $D(f_k)$ is set constant and nonlinear coefficient $N_2$ is varied.

FIG. 5 shows relation between wavelength spacing and FWM generated power, when wavelength dispersion value $D(f_k)$ is fixed and nonlinear coefficient $N_2$ is varied as 2.2, 2.4, 2.6 ($\times 10^{-10}$W$^{-1}$). Horizontal axis shows wavelength spacing and vertical axis shows FWM generated power.

From FIG. 5, it is confirmed that peak cycle of FWM generated power is not varied and level of FWM generated power is varied.

Thus, in the present invention, there is an important meaning that peak cycle of FWM generated power is varied by varying wavelength dispersion value $D(f_k)$, and FWM generated power level is varied by varying nonlinear coefficient $N_2$.

As explained above, in theoretical approximation equation (17) unknown value, nonlinear coefficient $N_2$ and wavelength dispersion value $D(f_k)$ are expected to be deduced by measuring FWM generated power in a plurality of wavelength spacing. However, it is turned out that the calculated value from the theoretical approximation equation and the measured value are not actually coincide.

Figure 6:
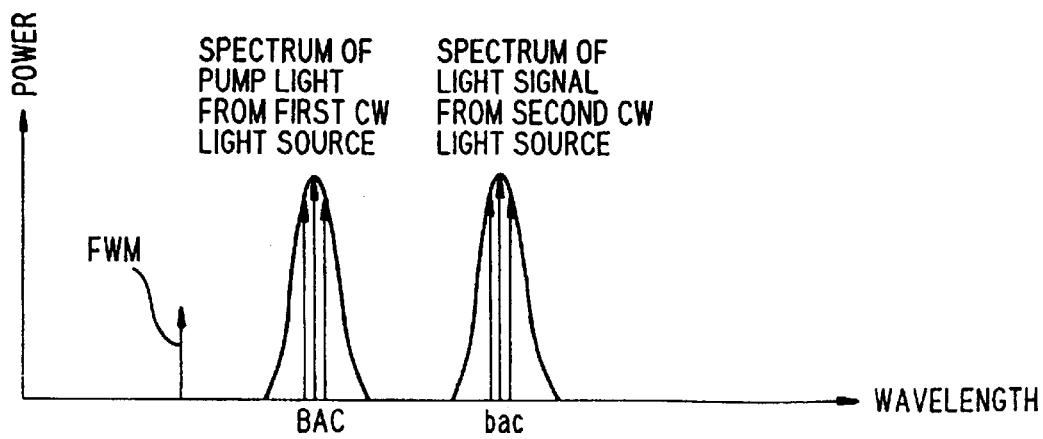
FIG. 6 is a graph showing wave form of pump light and signal light.

FIG. 6 shows wave form of pump light and signal light, horizontal axis shows wavelength and vertical axis shows optical intensity.

Figure 7:
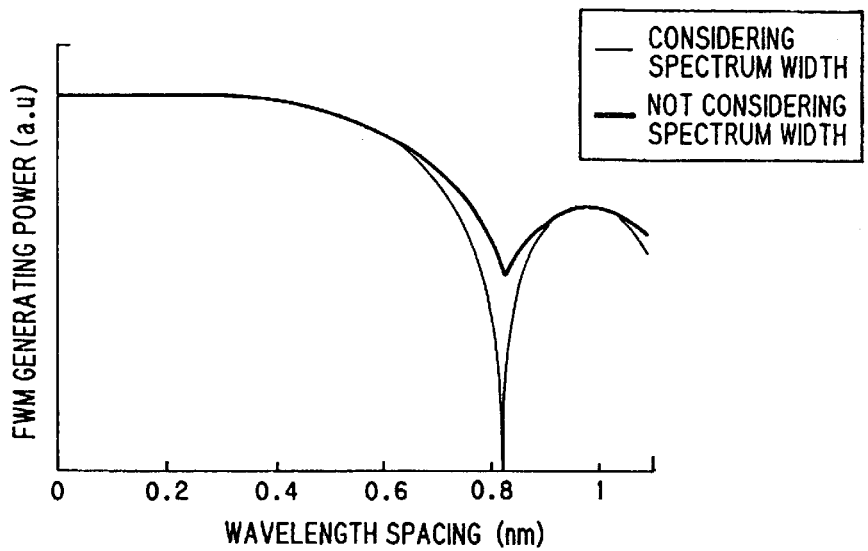
FIG. 7 is a graph showing difference of theoretical approximation equation when spectrum width of the CW light source is considered and not considered.

FIG. 7 shows difference of theoretical approximation equation between spectrum width of the CW light source is considered and not considered, horizontal axis shows wavelength spacing and vertical axis shows FWM generating power.

Generally, when relation between wavelength spacing of pump light and signal light respectively emitted from two CW light sources and optical intensity of FWM is deducted from theoretical approximation equation (17), peak wavelength (A) of pump light and peak wavelength (a) of signal light as shown in FIG. 6 are adopted as wavelength spacing. The calculated results are illustrated graphically in FIG. 4 and FIG. 5, and corresponding to the curve "not considering spectrum width" shown in FIG. 7.

However, since both pump light and signal light are precisely an aggregate of line spectrum, they are having width which made each peak wavelength (A), (a) to be a center as shown in FIG. 6.

The inventers of the present invention have attemted to calculate FWM optical intensity for combination (for example, combination of (A) and (b), (B) and (b) or etc.) of line spectrum (wavelength) other than peak wavelength, it was found out that there was a case in which FWM optical intensity is larger than the combination of peak wavelength (A) and peak wavelength (a), by the way of combination of line spectrum (wavelength).

Based on this knowledge, in the present invention, a plurality of FWM optical intensity are obtained for every each wavelength spacing by calculating FWM optical intensity in combination of all line spectrum of two CW light source based on equation (17), and maximum value in every wavelength spacing is adopted as FWM optical intensity in the wavelength spacing. The maximum values are illustrated graphically in the curve "considering spectrum width" shown in FIG. 7.

Figure 8:
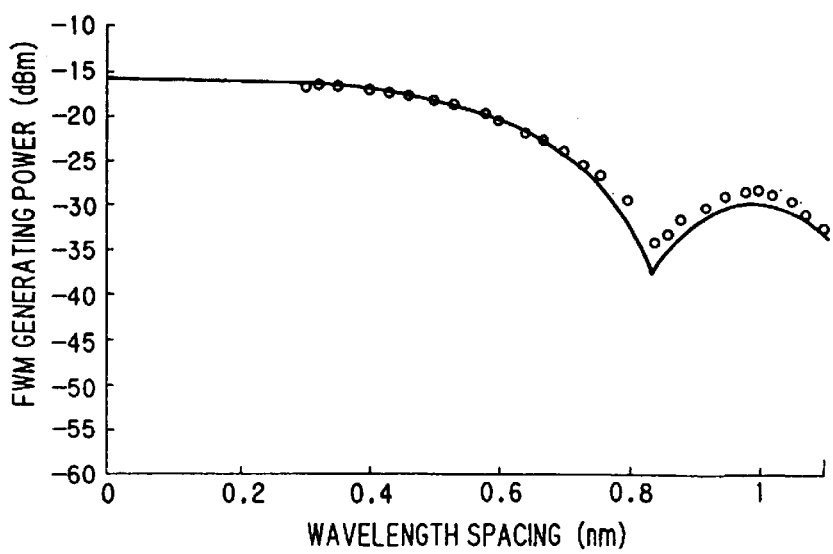
FIG. 8 is a graph showing fitting to obtain nonlinear coefficient $N_2$ and wavelength dispersion value $D(f_k)$ according to the embodiment of the present invention.

FIG. 8 is showing fitting to obtain nonlinear coefficient $N_2$ and wavelength dispersion value $D(f_k)$ according to the embodiment of the present invention, horizontal axis shows wavelength spacing and vertical axis shows FWM generated power. In addition, round mark shows measured value and solid line shows theoretical approximate calculation value.

It is understood that by fitting theoretical approximate calculation value and measured value in case of "considering spectrum width" as shown in FIG. 8, both are almost coinciding, but when the curve is "not considering spectrum width", both are not coinciding.

From the above descriptions, in this embodiment, measure optical intensity for each spectrum of pump light and signal light emitted from two CM light sources by spectrum analyzer, and calculate maximum value of FWM optical intensity in each wavelength spacing for every line spectrum. When the curve "considering spectrum width" in FIG. 8 obtained from this calculated result is coincide with measured value of FWM optical intensity, nonlinear coefficient $N_2$ and wavelength dispersion value $D(f_k)$ substituted for equation (17) are obtained simultaneously as nonlinear coefficient $N_2$ and wavelength dispersion value $D(f_k)$ of the test optical fiber.

By repeating operations of the present invention several times by varying wavelength of the CW light source, wavelength dispersion value D is measured for many wavelengths. Accordingly, by measuring the slope of wavelength dispersion value D, wavelength dispersion slope $dD/d\lambda$ can be obtained.

By carrying out measurement considering spectrum width of pump light and signal light, for $A_{\it eff}$ expansion optical fiber having length 500 m, nonlinear coefficient $N_2$ value $(n_2/A_{\it eff})$ is $2.14 \times 10^{-10}$ $(W^{-1})$, and wavelength dispersion D value is 23.5 (ps/nm/km) are obtained.

For the same optical fiber, nonlinear coefficient $N_2$ is measured by conventional CW-SPM method, $n_2/A_{\it eff}=2.19 \times 10^{-10}$ $(W^{-1})$ is obtained. The measurement of the CW-SPM method was carried out under the situation that optical fiber length, dispersion value and wavelength spacing of incidental light source were the most optimum value.

A measurement apparatus of the present invention is not limited to the above embodiment, for example, fitting can be automatically carried out by using computer. Namely, measurement value of nonlinear coefficient $N_2$ and wavelength dispersion value $D(f_k)$ can be obtained automatically. Further, instead of varying wavelength spacing of light source, any embodiment which can measure wavelength dispersion value $D(f_k)$ by utilizing periodicity of FWM generated power is applicable to the present invention. Further more, any embodiment which can measure nonlinear coefficient $N_2$ and wavelength dispersion value $D(f_k)$ by analyzing FWM generated power by considering spectrum width of light source is applicable to the present invention.

Apparent from the foregoing description, according to the present invention, a method and an apparatus for measuring wavelength dispersion value and/or nonlinear coefficient of optical fibers that can realize high accurate nonlinear coefficient and wavelength dispersion value without influence of incidental power at measurement, length of test optical fiber, wavelength spacing of light source, and change of wavelength dispersion value of light source are provided.

What is claimed is:

1. A method for measuring wavelength dispersion value and/or nonlinear coefficient of optical fibers comprising:

a process for emitting a pump light emitted from a first continuous wave light source and a signal light emitted from a second continuous wave light source to a test optical fiber by varying peak wavelength spacing between said pump light and said signal light, and measuring four wave mixing optical intensity generated in said test optical fiber at every peak wavelength spacing;

a process for measuring optical intensity of a plurality of line spectrum constituting said pump light and a plurality of line spectrum constituting said signal light respectively; and a process for calculating so that maximum value of four wave mixing optical intensity in each line spectrum wavelength spacing calculated from said measured optical intensity of line spectrum of said pump light and said signal light coincides with measured value of optical intensity of four wave mixing in each peak wavelength spacing, and obtaining nonlinear coefficient and/or wavelength dispersion value.

2. A method for measuring wavelength dispersion value and/or nonlinear coefficient of optical fibers comprising:

a process for emitting a pump light emitted from a first continuous wave light source and a signal light emitted from a second continuous wave light source to a test optical fiber by varying peak wavelength spacing between said pump light and said signal light, and measuring four wave mixing optical intensity generated in said test optical fiber at every peak wavelength spacing;

a process for measuring optical intensity of a plurality of line spectrum constituting said pump light and a plurality of line spectrum constituting said signal light respectively; and a process for calculating so that maximum value of four wave mixing optical intensity $P_1(L)$ in each line spectrum wavelength spacing calculated from substituting measured optical intensity of line spectrum of said pump light and said signal light, and nonlinear coefficient $N_2$ and wavelength dispersion value $D(f_k)$ as variable numbers for the equation $$P_1(L) = \eta'(2\pi N_2/\lambda_p)^2 P_p{}^2 P_s \exp(-\alpha L)[\{1-\exp(-\alpha L)\}/\alpha]$$

(where, $\lambda_p$ is wavelength of pump light, Pp is optical intensity of line spectrum of pump light, Ps is optical intensity of line spectrum of signal light, $\alpha$ is transmission loss of optical fiber, and L is length of test optical fiber)

coincides with measured value of optical intensity of four wave mixing in each peak wavelength spacing, and obtaining nonlinear coefficient and/or wavelength dispersion value from the value of said substituted nonlinear coefficient $N_2$ and wavelength dispersion value $D(f_k)$ as variable numbers.

Where, $\eta'$ is four wave mixing (FWM) efficiency expressed by equation, $$\eta' = \{P_1(L, \Delta k') P_1(L, \Delta k = 0)\}$$
$$= [\alpha^2/\{\alpha^2 + (\Delta k')^2\}][1 + \{4\exp(-\alpha L)\sin^2(\Delta k' L/2)\}/$$
$$\{\exp(-\alpha L) - 1\}^2]$$

where, $\Delta k'$ is phase adjustment factor expressed by equation, $$\Delta k' = \Delta k - (2\pi N_2/\lambda_p)(2P_p - P_s)[\{1-\exp(-\alpha L_{\mathit{eff}})\}/\alpha L_{\mathit{eff}}]$$

where, $\Delta k$ is expressed by equation, $$\Delta k = 2|f_p - f_s|^2 2\pi \lambda_s^2 D(f_k)/c$$

(where, $f_p$ is frequency of line spectrum of pump light, $f_s$ is frequency of line spectrum of signal light, and $\lambda_s$ is wavelength of line spectrum of signal light)

and $L_{\mathit{eff}}$ is effective length of test optical fiber expressed by equation:

$$L_{\mathit{eff}} = \{1-\exp(-\alpha L)\}/\alpha$$

3. An apparatus for measuring wavelength dispersion value and/or nonlinear coefficient of optical fibers comprising:

a first continuous wave light source for emitting a pump light;

a second continuous wave light source for emitting signal light with different peak wavelength from said pump light and varying peak wavelength;

a spectrum analyzer for measuring four wave mixing optical intensity generated in test optical fiber by emitting said pump light and said signal light to test optical fiber for each peak wavelength spacing, and for measuring optical intensity of a plurality of line spectrum constituting said pump light and a plurality of line spectrum constituting said signal light respectively; and an operating circuit for obtaining nonlinear coefficient and/or wavelength dispersion value by calculating so that maximum value of four wave mixing optical intensity in each spectrum wavelength spacing calculated from optical strength of line spectrum of said pump light and said signal light measured by said spectrum analyzer coincides with measured value of four wave mixing optical intensity in each spectrum wavelength spacing measured by said spectrum analyzer.

4. An apparatus for measuring wavelength dispersion value and/or nonlinear coefficient of optical fibers according to claim 3, wherein said operating circuit is mounted in said spectrum analyzer.

* * * * *